METAL LOSS BY THREE MEDIA

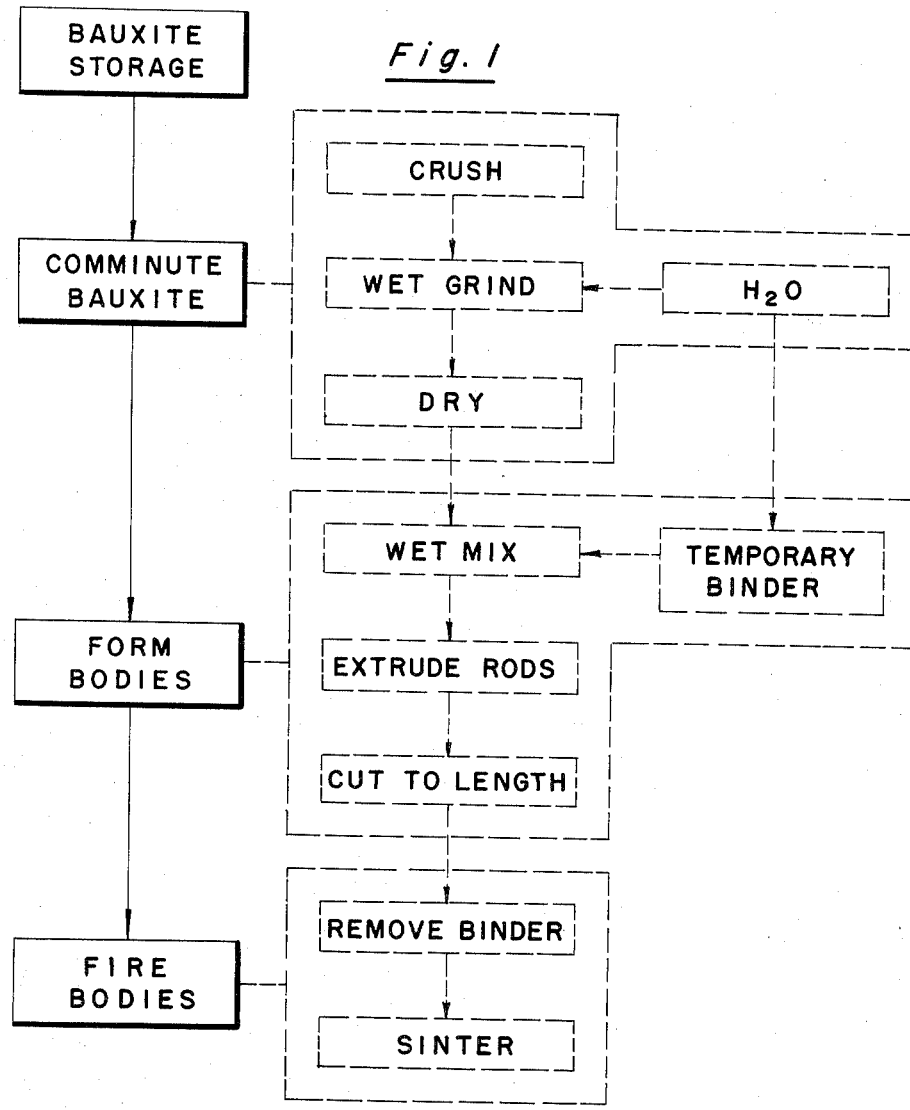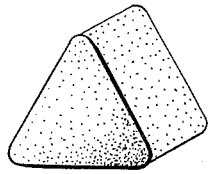

United States Patent Office 3,239,970
Patented Mar. 15, 1966

3,239,970
**METHOD OF REMOVING SURFACE IRREGU-
LARITIES FROM METAL ARTICLES**
George W. Bishop, North Tonawanda, N.Y., assignor to
The Carborundum Company, Niagara Falls, N.Y., a
corporation of Delaware
Filed Aug. 6, 1962, Ser. No. 214,887
6 Claims. (Cl. 51—313)

This invention relates to the method of removing surface irregularities from metal articles employing sintered microcrystalline bauxite.

Tumbling media are bodies of various kinds and shapes which are used for various purposes. Well known tumbling media are porcelain balls and flint pebbles which are placed in a mill together with material to be treated. For instance, porcelain or flint pebbles may be used to mill or grind porcelain slip or ceramic glaze for tiles. Other grinding media have been used for cleaning and polishing metal objects by tumbling the metal objects and grinding media in a mill.

Grinding media should be suitable for the intended purpose. If it is intended that grinding media be used for removing metal from metal objects, the rate of metal removal from the object should be satisfactory and the rate of media loss must not be too great. If it is too great, the cost of the media is excessive.

Grinding media have been made of various materials, one of which is high purity alumina which is quite expensive. I have discovered that very satisfactory grinding media can be made from bauxite. Bauxite, in addition to alumina, contains appreciable quantities of iron oxide, silica and titania. It has been the general belief in the art that the presence of these oxides prevents the transformation of bauxite into satisfactory grinding media when bauxite is subjected to high temperatures. I have found, however, that very satisfactory microcrystalline tumbling media can be made from bauxite, rather than from high purity alumina, provided that the process is carried out in a manner more particularly hereinafter described and illustrated in the accompanying drawings wherein:

FIGURE 1 is a schematic flow diagram of the inventive process, the basic steps being shown in solid lines to the left and the detailed steps being shown in broken lines to the right;

FIGURE 2 is a perspective view of a typical triangular tumbling pellet produced in accordance with the invention.

Figure 3:
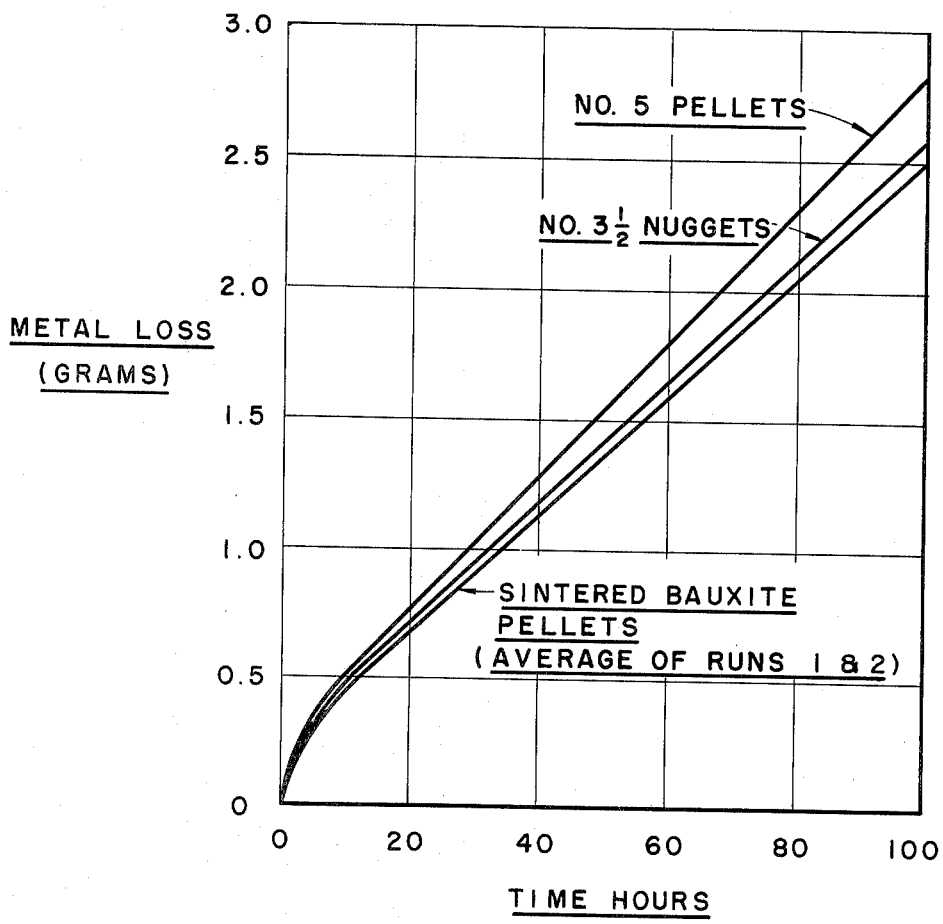
FIGURES 3 and 4 are graphs illustrating the results of comparative tests.

A typical analysis of bauxite is:

| | |
|---|---|
| $SiO_2$ | 2.14 |
| $TiO_2$ | 3.83 |
| $Fe_2O_3$ | 5.85 |
| $MgO$ | .20 |
| $Al_2O_3$ | 86.54 |
| Ignition loss | 1.44 |

In carrying out the present method of making microcrystalline bauxite tumbling media, the bauxite, as illustrated in FIGURE 1, is comminuted to a very fine particle size. Substantially all of the bauxite should be comminuted to an average particle size of not more than 5 microns. Preferably, the major portion of the comminuted bauxite is less than 15 microns in size, with not more than 5% greater than 20 microns. Such sizes may be achieved in a number of ways. One way is to crush the bauxite to —40 mesh in a roll crusher and then wet grind it in a ball mill, utilizing steel, flint or alumina grinding media, until the proper size is obtained. The bauxite is partially de-watered and mixed with a suitable temporary binder such as starch or a mixture of starch and methyl cellulose. A small amount of bentonite, i.e., 1% by weight, may be included in the mixture for ease of forming.

The aforementioned wet mix is then formed into shapes or bodies which are to constitute the tumbling media. Although other methods of shaping into media may be employed, I prefer to extrude a mixture of proper consistency through a die and simultaneously cut the extruded rods or column into bodies of the desired length by use of moving wires or blades.

The mix can be extruded in triangular form or cylindrical form or in a square form or any other desired form.

Tumbling media according to this invention may be of various sizes. The cross-sectional dimension may vary from about 1/16" up to about 2", and the length may be varied according to desire. However, one should allow for about a 20–25% shrinkage which occurs when the extruded bodies are fired.

The extruded bodies are first heated in an oxidizing atmosphere to a temperature sufficient to burn out the temporary binder; this temperature should not exceed 1100° C. and is preferably between about 750 to 1000° C. The time required to burn out the temporary binder will depend upon the particular binder employed, the particular temperature, within the ranges above stated, and the method of kiln loading employed for this purpose.

The bodies are then heated to a higher temperature in order to sinter them. The sintering atmosphere may be oxidizing, normal or reducing. Typical firing mixtures are: 20% excess air for oxidation and 20% excess gas (viz. propane) for reduction, based on the normal or theoretical mixture of gas and air for complete combustion. An oxidizing or normal atmosphere is preferred as an excess of reduction tends to promote undesirable crystal growth resulting in increased friability of the bodies.

The time and temperature during sintering should be carefully controlled. If the sintering temperature is not sufficiently high or the time of sintering is not sufficiently long, the resulting product will not have adequate strength. On the other hand, if the temperature is too high or the sintering time is too long, an excessive crystal growth may occur which increases friability. The sintering temperature is between 1200° C. and 1600° C., generally between 1350 and 1500° C., the preferred sintering range being from about 1400 to 1450° C. The time of sintering at maximum temperature is between about 2 and 6 hours and is preferably between about 3 and 5 hours. The sintered bodies are then allowed to cool at any convenient rate.

The specific gravity of the finished microcrystalline sintered bauxite bodies is about 3.6 to 3.9. The average hardness is about 9+ on the Mohs scale and it ranges from about 1250 to about 2000 on the $Knoop_{100}$ scale.

The use of sintered microcrystalline bauxite tumbling media according to the present invention offers considerable savings over the use of tumbling media made from high purity alumina, because it is no longer necessary to use such high purity material to obtain comparable or even better results, as will be demonstrated below.

The cross-sectional shape of the extruded bodies may be round, square, polygonal, triangular, or of any other desired shape. A preferred shape, however, is triangular, as shown in FIGURE 2. If triangular shaped bodies are formed, the lengths of the sides of the triangle may be from 1/8" up to 2" and the thickness of the bodies may be between 1/8" and 7/8".

The following example will further illustrate the invention.

EXAMPLE I

Surinam bauxite of the composition previously given was ball milled for 50 hours, using a wet process, to produce comminuted bauxite in which substantially all of the comminuted material was less than 5 microns size. The following mix was made:

| | Parts by weight |
|---|---|
| Comminuted bauxite | 93.5 |
| Wheat starch | 6 |
| Methyl cellulose | 0.5 |

About 26 parts by weight of water were used to make an extrudable mass. This was extruded in triangular shapes of approximately 1⅛" on a side and 7/16" thick.

The triangular shaped pellets were placed in shallow saggers and placed in a propane gas-fired kiln. A low temperature burn was utilized to remove the temporary binder from the pellets in the initial stage of the firing process. This was accomplished by increasing the kiln temperature to 800° C. in increments up to 400° C. per hour, and holding for 4 hours. The temperature was then raised to 1400° C. at a rate of 100° C. per hour and held at that temperature for 2 hours. At this point the firing was stopped and the pellets were allowed to cool inside the kiln. This sintering process resulted in an approximate 24% dimensional shrinkage of the pellets. The color was tan to olive on the surface and black throughout the inside, the density of the pellets was 3.72 g./cc.

Figure 4:
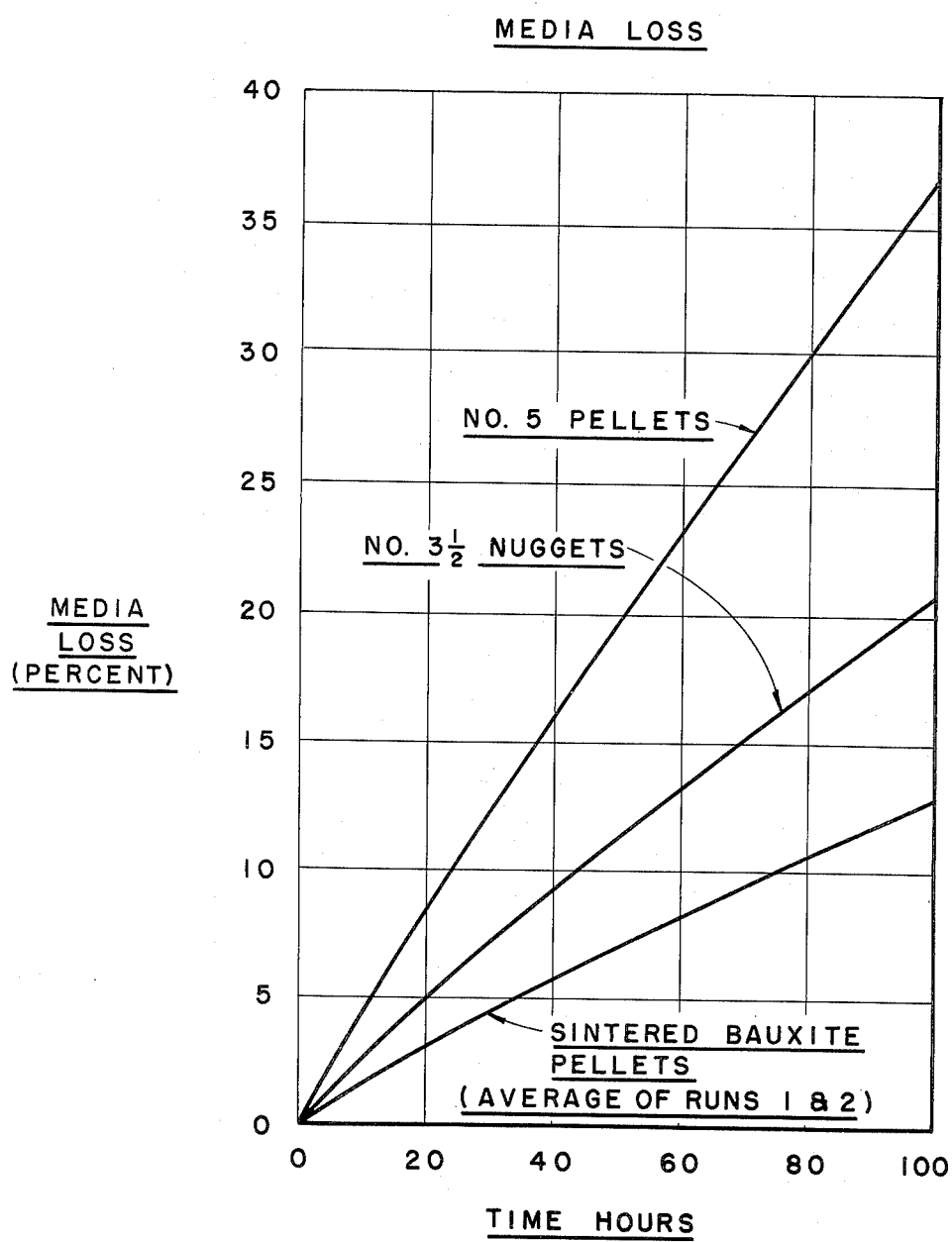

Tests were run for media loss and metal loss, comparing the pellets made according to Example I with two other types of grinding media, and the results are shown in FIGURES 3 and 4. In these figures, the pellets produced according to Example I are designated as "sintered bauxite pellets." One of the other grinding media is designated "No. 3½ nuggets" and the other grinding media is designated "No. 5 pellets."

The "No. 5 pellets" are triangular shaped aluminum oxide vitrified pellets, 5/16" thick x 1⅛" on each side.

The "No. 3½ nuggets" are aluminum oxide nuggets, generally round in shape, and having dimensions between ½" and ⅝".

Barrel finishing operations were conducted under the following conditions.

Media:
    (1) 50 lbs. No. 5 pellets
    (2) 90 lbs. No. 3½ nuggets
    (3) 80 lbs. sintered bauxite pellets (2 batches)
Compound: Aluminum oxide abrasive compound; one pound per barrel charge
Water: ½ gallon per barrel
Machine: Four 1.1 cubic foot barrels of a standard horizontal barrel finisher (17" diameter x 12" wide)
Speed: 150 s.f.p.m. (34–35 r.p.m.)
Metal: 5 pieces of 1 in. x 2 in. x ⅛ in. SAE 1020 steel per barrel
Time: 2, 5, 20, 40, 60, 80, 100 hours The barrels were charged and run for 2 hours after which the metal test pieces were removed and weighed, without dumping the media, compound and water. This was repeated after 5 hours. For the remainder of the test, starting with 20 hours, the entire contents of the barrels were dumped and rinsed, the metal pieces weighed, and fresh water and compound added. The media were dried and weighed after 20, 40 and 100 hours.

The results of the tests as shown on FIGURES 3 and 4 show the following:

(1) The media loss of the sintered bauxite pellets after 100 hours was 12.9%; the average amount of metal loss on the metal test pieces was 2.49 grams (approximately 7.5%).

(2) The media loss of the No. 5 pellets was 36.8%; metal loss was 2.80 grams (approximately 8.5%).

(3) The media loss of 3½ nuggets was 20.8%; metal loss was 2.54 grams (approximately 7.7%).

From FIGURES 3 and 4, it is evident that the sintered bauxite pellets of the present invention were greatly superior to the other two grinding media with respect to media loss and were almost as good as the other two media with respect to metal loss.

With respect to the over-all efficiency of the three grinding media, reference is made to the following Table 1:

*Table 1*

| Efficiency | $\frac{\text{Percent Metal Loss}}{\text{Percent Media Loss}}$ |
|---|---|
| No. 5 Pellets | $\frac{8.5\%}{36.8\%} = 0.23$ |
| No. 3½ Nuggets | $\frac{7.7\%}{20.8\%} = 0.37$ |
| Sintered Bauxite, Run 1 | $\frac{7.8\%}{12.8\%} = 0.61$ |
| Sintered Bauxite, Run 2 | $\frac{7.3\%}{13.0\%} = 0.56$ (0.59 average of 1 and 2) |

NOTE.—The percent metal loss is obtained by dividing the average weight of the 1 in. x 2 in. x ⅛ in. metal test pieces into the average weight loss (in grams) of those five pieces. Metal parts weigh approximately 33 grams each.

From Table 1, it is evident that the sintered bauxite pellets according to the present invention are distinctly superior to the other two grinding media.

Further tests were run to determine media loss and metal loss, comparing sintered bauxite pellets made according to the present invention with three high ceramic (silicate) bond aluminum oxide tumbling pellets, types 1, 2 and 3. Type 1 contained 46% bond, 27% 150 grit and finer $Al_2O_3$ and 27% 240 grit and finer $Al_2O_3$; type 2 contained 50% bond, 25% 150 grit and finer $Al_2O_3$ and 25% 240 grit and finer $Al_2O_3$; type 3 contained 70% bond and 30% 240 grit and finer $Al_2O_3$. All of the pellets 1, 2 and 3 and the sintered bauxite pellets were of triangular shape and had the dimensions ⅞" on a side and ½" thick. The test conditions and results were as follows.

*Test conditions*

Machine: Standard horizontal barrel finisher, four 1.1 cubic foot barrels
Speed: 150 s.f.p.m. (35 r.p.m.)
Water: ½ gallon
Load level: 60%
Compound: One pound of aluminum oxide abrasive compound
Metal: SAE 1020 steel, 1" x 2" x ⅛", five pieces per barrel
Time: 5, 15, 35 hours The four barrels were loaded with the four different pellets under the aforementioned conditions. The machine was started and run for five hours, after which the barrels were dumped of their contents, the media and metal being washed, dried, and weighed. This data recorded, the pellets were loaded back into their respective barrels with fresh water and compound, and run for ten more hours and, finally, for another twenty hours. The results were as follows.

*Table 2*

MEDIA LOSS
[Remaining weight—Percent Loss]

| Time, Hours | Type 1 | | Type 2 | | Type 3 | | Sintered bauxite pellets | |
|---|---|---|---|---|---|---|---|---|
| | Lbs. | Percent | Lbs. | Percent | Lbs. | Percent | Lbs. | Percent |
| 0 | 45.0 | ------ | 45.0 | ------ | 50.0 | ------ | 80.0 | ------ |
| 5 | 43.6 | 3.1 | 43.3 | 3.8 | 49.1 | 1.8 | 78.9 | 1.4 |
| 15 | 40.8 | 9.3 | 40.0 | 11.1 | 47.2 | 5.6 | 77.0 | 3.8 |
| 35 | 35.2 | 21.8 | 33.3 | 26.0 | 43.3 | 13.4 | 72.8 | 9.0 |

*Table 3*

METAL LOSS

[Metal removed—Percent]

| Time, Hours | Type 1 | Type 2 | Type 3 | Sintered bauxite pellets |
|---|---|---|---|---|
| 5 | 3.1 | 3.1 | 2.2 | 4.3 |
| 15 | 9.5 | 9.6 | 8.4 | 15.2 |
| 35 | 21.2 | 21.8 | 17.3 | 32.4 |

From the results shown in Tables 2 and 3, it is evident that the sintered bauxite pellets according to the present invention were distinctly superior to the type 1, 2 and 3 pellets, both with respect to media loss and with respect to metal loss.

The following Table 4 gives comparative data of applicant's sintered bauxite pellets and a brand of high purity alumina pellets now on the market:

*Table 4*

| | Sintered bauxite pellets | High purity alumina pellets |
|---|---|---|
| Microstructure | 10 micron and finer. | 5 micron and finer. |
| Hardness (Knoop$_{100}$ Scale) | 1,250–1,950 | 1935. |
| Specific gravity | 3.70–3.90 | 3.90–3.95. |
| Purity (Al$_2$O$_3$) | Approx. 84–86% | 98%. |
| Metal loss after 100 hours [1] | 7.5% | 6.6%. |
| Media loss after 100 hours [1] | 12.9% | 10.3%. |

[1] The barrel finishing test consisted of tumbling the two media for 100 hours in separate 1.1 cubic foot closed barrels of a horizontal tumbler at 35 r.p.m. To each barrel was added one-half gallon of water, five 1″ x 2″ x ⅛″ pieces of SAE 1020 steel (for work rate comparisons), and one pound of an abrasive compound. The barrels were rinsed and recharged every 25 hours.

It will be seen that for all practical purposes the performance of the two grinding media in a simulated normal barrel finishing operation is identical. It will be noted, however, that, as previously stated, the use of applicant's sintered bauxite grinding media offers considerable savings over the use of pellets made of high purity alumina.

I claim:

1. A method of removing surface irregularities from metal articles by abrasion which comprises tumbling said articles with a tumbling media consisting essentially of sintered microcrystalline bauxite.

2. A method according to claim 1 in which said sintered microcrystalline bauxite tumbling media has a hardness of from about 1250 to about 2000 on a Knoop$_{100}$ scale.

3. A method according to claim 1 in which said sintered microcrystalline bauxite tumbling media has a specific gravity in the range of from about 3.6 to about 3.9.

4. A method according to claim 1 in which said sintered microcrystalline bauxite tumbling media has a cross-section dimension of between about 1/16″ and 2″.

5. A method according to claim 1 in which said sintered microcrystalline bauxite tumbling media is triangular in shape having sides between ⅛″ and 2″ in length and a thickness of between ⅛″ and ⅞″.

6. A method according to claim 1 in which said sintered microcrystalline bauxite tumbling media has a hardness of from about 1250 to about 2000 on the Knoop$_{100}$ scale and a specific gravity of between about 3.6 and 3.9.

References Cited by the Examiner

UNITED STATES PATENTS

| 2,947,124 | 8/1960 | Madigan et al. | 51—164.5 |
| 2,978,850 | 4/1961 | Gleszer | 51—164.5 |
| 3,079,243 | 2/1963 | Ueltz | 51—309 |

ROBERT C. RIORDON, *Primary Examiner.*

JOHN C. CHRISTIE, J. SPENCER OVERHOLSER, ANDREW R. JUHASZ, *Examiners.*